United States Patent [19]

Hood

[11] Patent Number: 5,418,640
[45] Date of Patent: May 23, 1995

[54] SPATIALLY GRADED OPTICAL SWITCH

[75] Inventor: Patrick J. Hood, Beavercreek, Ohio

[73] Assignee: The United States of America as represented by the Secretary of the Air Force, Washington, D.C.

[21] Appl. No.: 55,346

[22] Filed: May 3, 1993

[51] Int. Cl.⁶ .............................................. G02F 1/01
[52] U.S. Cl. .................................. 359/265; 359/240; 359/254; 359/885; 359/888
[58] Field of Search ............... 359/240, 265, 254, 885, 359/888

[56] References Cited

U.S. PATENT DOCUMENTS

| | | | |
|---|---|---|---|
| 3,245,315 | 4/1966 | Marks et al. | 359/254 |
| 4,515,429 | 5/1985 | Smith et al. | 350/96.13 |
| 4,545,646 | 10/1985 | Chern et al. | 350/162.2 |
| 4,776,677 | 10/1988 | Park et al. | 350/354 |
| 4,909,609 | 3/1990 | McDowell | 350/354 |
| 5,018,833 | 5/1991 | Bennett et al. | 359/888 |
| 5,111,343 | 5/1992 | Harrigan | 359/885 |
| 5,142,418 | 8/1992 | Spry | 359/885 |
| 5,189,537 | 2/1993 | O'Farrell | 359/254 |

OTHER PUBLICATIONS

Proceedings of the IRE: "Optical Materials, Films, Filters for Infrared Instrumentation", Wolfe and Ballard; vol. 47; Sep. 1959 pp. 1540–1546.

*Primary Examiner*—Joseph A. Popek
*Assistant Examiner*—F. Niranjan
*Attorney, Agent, or Firm*—Bobby D. Scearce; Thomas L. Kundert

[57] ABSTRACT

A spatially graded optical switch is described which comprises a transparent substrate, a layer of optically switchable material deposited on the substrate and having optical thickness which is a preselected function of radial distance from the center of the substrate, and electrical or thermal means for switching the material between an OFF state characterized by high transmission (or reflection) and an ON state at which transmission (or reflection) is attenuated smoothly with radius across the switch, according to a preselected profile, from substantially zero at the center to about 100% at the outer edge.

10 Claims, 2 Drawing Sheets

SPATIALLY GRADED OPTICAL SWITCH

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a solid state optical device capable of actively modifying the intensity distribution across the entrance aperture of an electro-optic sensor to reduce saturation of the entire image by a bright point source. The invention may preferably be used in conjunction with a spatial light modulator (which can selectively block a region in an image) placed at an intermediate image plane or with a detector array capable of handling large over saturation without affecting the performance of the surrounding detector elements.

A problem with existing electro-optical systems is that the entrance aperture for collecting light from the scene has a uniform intensity profile. That is, within the entrance aperture transmission into the system is a fixed percentage, t, and outside the aperture the transmission is zero. The edge of the entrance aperture, where transmission goes from zero to t, creates diffraction within the electro-optic system Under normal operating conditions, where the intensity of light from the scene is within an order of magnitude or two, diffraction effects within the system do not cause problems, However, if a brightpoint source, of greater intensity than about three orders of magnitude above detector saturation, is within the system field of view, diffraction of the bright source by the edges of the entrance aperture will cause saturation of the surrounding regions of the image.

The invention substantially reduces effects of a bright source on an electro-optic system having conventional optical switching devices by providing an optical switch comprising a layer of optical switching material with optical thickness which is a preselected function of switch radius. The invention may be switched between a normal highly transparent window and soft aperture with graded attenuation. In the unswitched (OFF) state for the switching material, the switch is a high transmission (or reflection) window (or mirror). In the switched (ON) state, attenuation of transmission (or reflection) varies smoothly radially across the switch width, from substantially zero at the center of the switch to substantially 100% at the outer edge. The thickness profile may be selected according to an attenuation profile required for a specific system.

An optical switch structured according to the invention, being achromatic, protects against all types of high intensity sources. In operation, the switch modifies the transmittance function incident on the entrance aperture of a protected optical system. With the invention in place, a system may operate normally without sacrificing operational throughput. The invention can be retrofit to existing systems.

It is therefore a principal object of the invention to provide an optical switching device.

It is a further object of the invention to provide a spatially graded optical switch.

These and other objects of the invention will become apparent as a detailed description of representative embodiments proceeds.

SUMMARY OF THE INVENTION

In accordance with the foregoing principles and objects of the invention, a spatially graded optical switch is described which comprises a transparent substrate, a layer of optically switchable material deposited on the substrate and having optical thickness which is a preselected function of radial distance from the center of the substrate, and electrical or thermal means for switching the material between an OFF state characterized by high transmission (or reflection) and an ON state at which transmission (or reflection) is attenuated smoothly with radius across the switch, according to a preselected profile, from substantially zero at the center to about 100% at the outer edge.

DESCRIPTION OF THE DRAWINGS

The invention will be more clearly understood from the following detailed description of representative embodiments thereof read in conjunction with the accompanying drawings wherein.

DETAILED DESCRIPTION

Figure 1A:
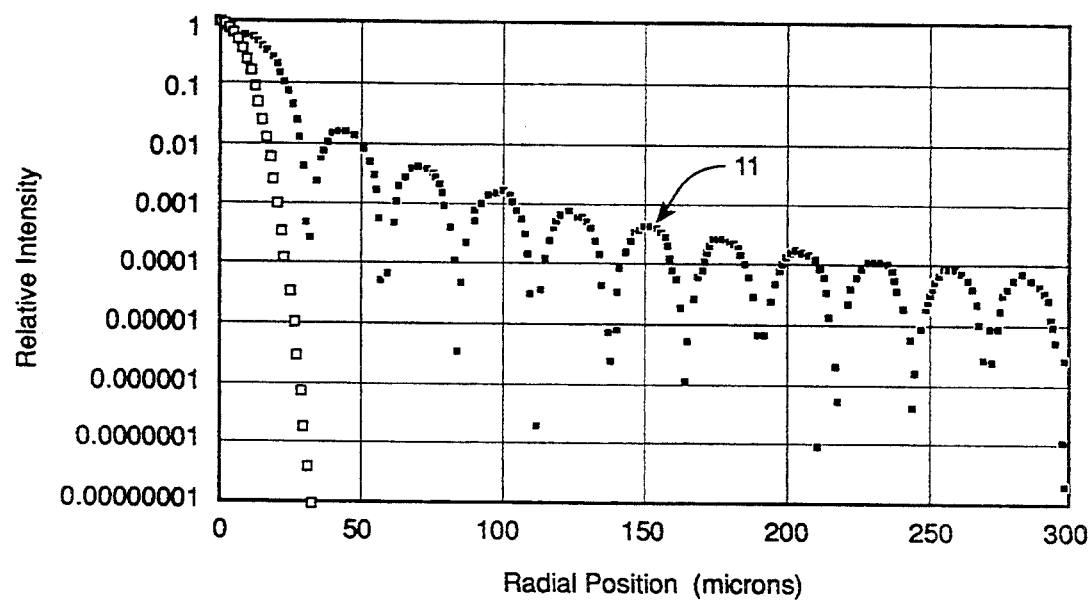
FIGS. 1a and 1b are graphs of relative intensity versus radius of Airy disk intensity profiles generated by a circular aperture in front of an electro-optic system on a log scale for 10 micron ($\mu$) radiation at the focal plane of a diffraction limited system with system f-numbers of 2.5 and 5, respectively.
Figure 1B:
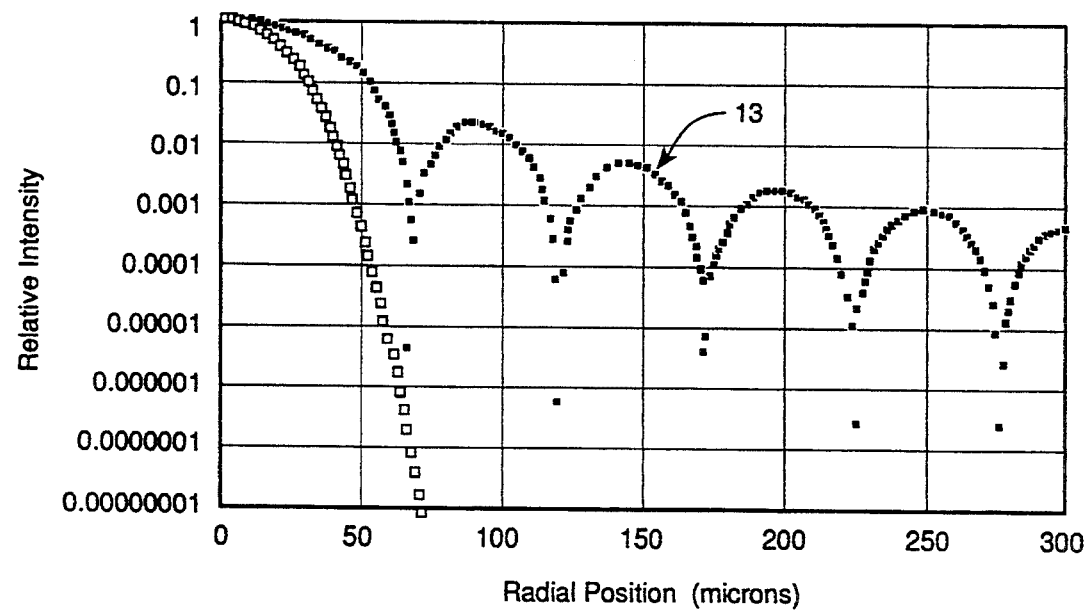

Referring now to the drawings, FIGS. 1a and 1b show graphically the Airy disk intensity profiles 11,13 on a log scale at the focal plane of a diffraction limited system with a circular aperture and system f-number of 2.5 (FIG 1a) and 5 (FIG 1b) for 10$\mu$ incident radiation. FIGS. 1a and 1b show that in an f/2.5 optical system, viewing a bright source having brightness $10^4$ greater than the detector saturation level, detector pixels up to 250$\mu$ from the source location would be saturated because of diffraction. At greater source intensities the entire image may be saturated.

In accordance with a governing principle of the invention, diffraction rings in the point spread function at the focal plane can be reduced or eliminated by modifying the transmission function at the entrance aperture of the system. For example, if the entrance aperture has a Gaussian transmission function, then the point spread function at the image plane is also Gaussian. FIGS. 1a,1b show a comparison of the point spread functions generated by a hard circular aperture and an aperture with the transmission which varies radially as a Gaussian function; energy which causes detector saturation away from the central intensity peak can be significantly reduced with a soft aperture.

Figure 2B:
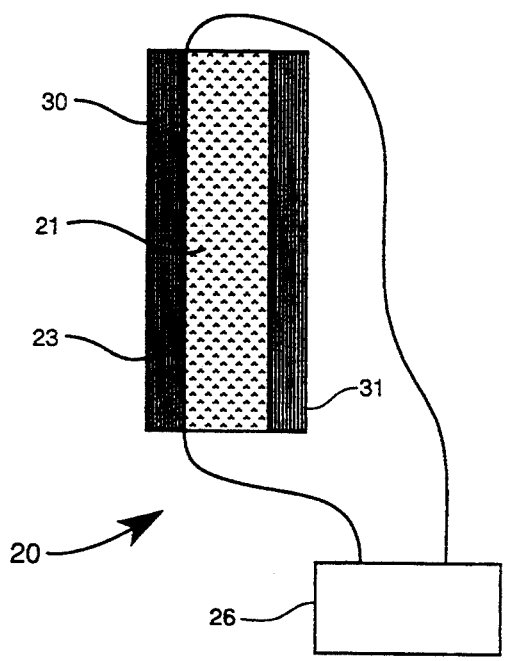
FIG. 2b is a view of the FIG. 2a switch taken along line B—B.
Figure 2A:
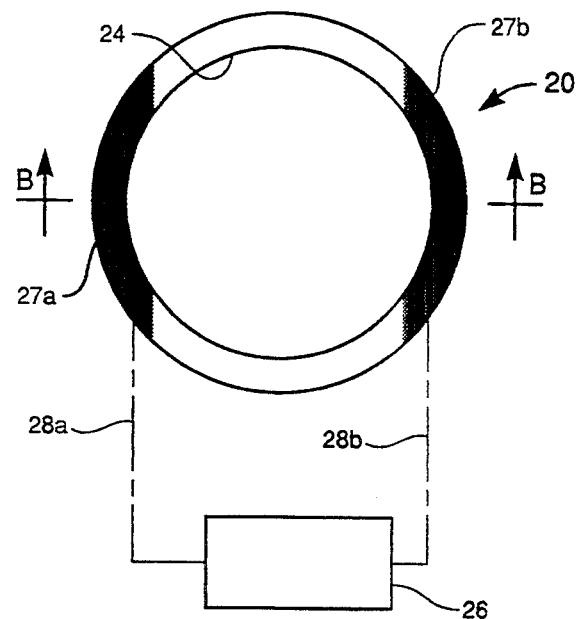
FIG. 2a is a schematic plan view of a representative optical switch embodiment according to the invention.

FIG. 2a shows a plan view of a representative optical switch 20 of the invention. FIG. 2b is a view in axial section of switch 20 taken along line B—B of FIG. 2a. In accordance with a principal feature of the invention, switch 20 comprises a layer of thermochromic or electrochromic material, described more fully below, which transitions (switches) between transmissive and reflective states upon application or removal of sufficient heat or electric field. Switch 20 may therefore comprise a substantially transparent substrate 21 having deposited thereon an active coating 23 having desired switching characteristics, as described more fully below in relation to FIG. 3. Switch 20 defines transmission aperture 24 of size preselected to accommodate a particular system application. Substrate 21 may preferably comprise silica based glasses, plastics and the like for operation in the visible to near infrared spectral range (0.4–1.5$\mu$); silicon, germanium, zinc sulfide, zinc selenide, Alon TM, Spinnel TM, lanthanum doped yttria, gallium arsenide, diamond or the like for operation in the mid-infrared (1.5–5$\mu$); and zinc selenide germanium or diamond for operation in the long infrared (5–15$\mu$). Generator means 26 is operatively connected to coating 23 at contacts 27a,b through suitable connecting means 28a,b to provide a source of thermal or electrical energy for active transition control of coating 23 material. Antireflective coatings 30,31 of conventional composition applied conventionally may be included to enhance transmissibility of switch 20.

Figure 3:
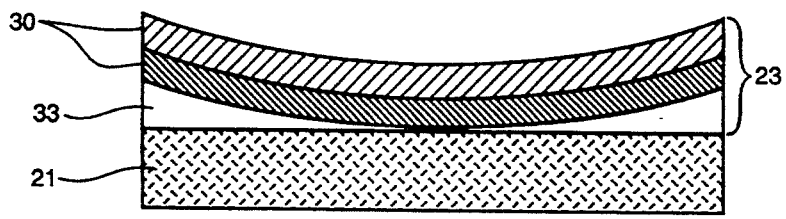
FIG. 3 is a view (not to scale) of a representative substrate, switch material layer and antireflective coating structure for the FIG. 2a,2b switch.

Referring now to FIG. 3, shown schematically therein is a view, substantially enlarged in the axial direction, of representative structure for substrate 21 and coating 23 of switch 20. According to a principal teaching of the invention, coating 23 comprises a layer 33 of switchable material graded in optical thickness radially outwardly from the center. Antireflective coatings 30 may be applied to the outer surface of layer 33. The specific design of the antireflective layers is dependent on the specific wavelength band and the selected switchable material for layer 33, as might occur to the skilled artisan in the thin film interference field.

Numerous thermochromic and electrochromic materials known in the applicable art having desired switching characteristics and electrical and thermal properties may be used in the structure of switch 20, the specific material selection not being considered limiting of the invention. Suitable thermochromic materials for use in the invention (and characteristic transition temperatures) may include vanadium dioxide (68° C.), $V_2O_3$ ($\sim -130°$ C.), $Ag_2S$ (177° C.), SmS, VO ($\sim -250°$ C.), $Ag_2Se$ ($\sim 150°$ C.), $Ag_2Te$ ($\sim 80°$ C.), $Cu_2S$ ($\sim 100°$ C.) and selected mixtures of the foregoing. Electrochromic materials suitable for use may include nickel hydroxide, tungsten oxide and other dielectric, organic and organometallic thin film materials.

In structures according to the invention which comprise a thermochromic material, generator means 26 may include a suitable heater operatively connected to switch 20 in order to controllably heat switchable layer 33 between transparent and reflective states. For example, the thermochromic materials may be switched by electrically (ohmically) heating the substrate to a temperature above the transition temperature of the switchable material. In structures utilizing electrochromic materials, transparent thin film electrodes (contacts 27a,b) may be incorporated into the layered structure of switch 20 for electrical connection to generator means 26 comprising a generator for applying an electric field across the electrochromic material, in manner known to the skilled artisan, to alter the complex refractive index of the material.

Figure 4:
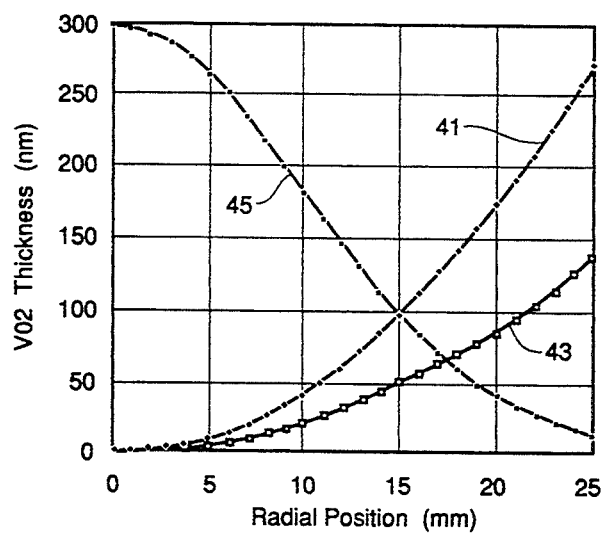
FIG. 4 is a graph of optimum switching material thickness versus radial position in a switch of the invention utilizing vanadium dioxide switching material for long wavelength infrared operation and mid-range wavelength infrared operation, overlaid with the transmission profile for the switch in the 3–5$\mu$ and 8–12$\mu$ spectral regions.

When the material comprising layer 33 switches, the complex portion of the refractive index increases; for $VO_2$ the increase is from about 0.1 to more than 7. The exact values of the complex refractive index for the switchable materials are strongly dispersive through the infrared. A thickness gradient results in graded transmission or reflection across the aperture when switched. The specific optical thickness gradient must be calculated for each specific switchable material and wavelength region. For example, each 100 nm of $VO_2$ results in roughly one optical density unit in the 3–5$\mu$ spectral band and 0.5 optical density unit in the 8–12$\mu$ spectral band. Deposition methods for thin films with specific thickness gradients are known in the applicable art. FIG. 4 is a graph of optimum switching material thickness versus radial position in a 50 mm diameter switch structured according to the invention utilizing $VO_2$ switching material for long wavelength infrared operation (graph 41) and mid-range wavelength infrared operation (graph 43), overlaid with the transmission profile (graph 45) for the switch in the middle wavelength infrared and long wavelength infrared spectral regions, respectively. The Gaussian transmission profile 45 is truncated to 4% of the peak transmission at the outer diameter, resulting in 30% transmission in the switched state as compared to a clear aperture. Truncation of the Gaussian transmission profile will introduce some diffraction into the system, but at intensity levels many orders of magnitude lower than a conventional fixed clear aperture.

It is noted that an embodiment of the invention herein may comprise a layered structure including a switchable layer having a radially graded optical thickness profile and which is highly reflective in a normal (OFF) state and absorptive in the switched (ON) state. Under normal operation this embodiment is uniformly reflective and may be switched to a soft aperture by grading the reflectivity to near zero at the outer edge of the device.

It is noted further that a switch according to the invention may be constructed using switchable material selected for passive switch operation, wherein no heat or electric field is applied in operation, but the switchable material transitions from a normal operation substantially transparent state to a switched reflective state upon absorption of heat from the invasive radiation.

The invention therefore provides an improved optical device comprising a spatially graded optical switch having resistance to damage from invasive radiation. It is understood that modifications to the invention may be made within the scope of the appended claims as might occur to one with skill in the field of the invention. All embodiments contemplated hereunder which achieve the objects of the invention have therefore not been shown in complete detail. Other embodiments may be developed without departing from the spirit of the invention or from the scope of the appended claims.

I claim:

1. A spatially graded optical switch, comprising:
   (a) a substantially transparent substrate;
   (b) a layer of optically switchable material deposited on said substrate and having an optical thickness profile which is a preselected function of radial distance from the center of said substrate toward an outer edge thereof;

(c) wherein said switchable material is a thermochromic material selected from the group consisting of vanadium oxide, $V_2O_3Ag_2S$, SmS, VO, $AG_2Se$, $Ag_2Te$ and $Cu_2S$; and (d) electrical or thermal means for switching the material between an OFF state characterized by one of substantially totally transmissive and substantially totally reflective states and an ON state at which said one of substantially totally transmissive and substantially totally reflective states is attenuated smoothly with radius from said center to said outer edge according to a preselected profile from substantially zero attenuation at the center to about 100% attenuation at said outer edge.

2. The switch of claim 1 wherein said switchable material is an electrochromic material selected from the group consisting of nickel hydroxide and tungsten oxide.

3. A spatially graded optical switch, comprising:
(a) a substantially transparent substrate;
(b) a layer of optically switchable material deposited on said substrate and having an optical thickness profile which is a preselected function of radial distance from the center of said substrate toward an outer edge thereof;
(c) electrical or thermal means for switching the material between an OFF state characterized by one of substantially totally transmissive and substantially totally reflective states and an ON state at which said one of substantially totally transmissive and substantially totally reflective states is attenuated smoothly with radius from said center to said outer edge according to a preselected profile from substantially zero attenuation at the center to about 100% attenuation at said outer edge: and (d) generator means operatively connected to said layer for controllably switching said material, wherein said generator means includes a heater operatively connected to said layer for controllably heating said switchable layer.

4. The switch of claim 3 wherein said switchable material is a thermochromic material selected from the group consisting of vanadium oxide, $V_2O_3Ag_2S$, SmS, VO, $AG_2Se$, $Ag_2Te$ and $Cu_2S$.

5. The switch of claim 1 wherein said preselected profile is a Gaussian function.

6. The switch of claim 1 wherein said substrate comprises a material selected from the group consisting of silicon, silicon based glasses, plastics, germanium, zinc sulfide, zinc selenide, lanthanum doped yttria, gallium arsenide, diamond, and diamond.

7. The switch of claim 1 further comprising an antireflective coating on at least one of said layer and substrate.

8. The switch of claim 3 wherein said preselected profile is a Gaussian function.

9. The switch of claim 3 wherein said substrate comprises a material selected from the group consisting of silicon, silicon based glasses, plastics, germanium, zinc sulfide, zinc selenide, lanthanum doped yttria, gallium arsenide, diamond, and diamond.

10. The switch of claim 3 further comprising an antireflective coating on at least one of said layer and substrate.

* * * * *